United States Patent Office 3,481,988
Patented Dec. 2, 1969

---

3,481,988
PRODUCTION OF TERTIARY PHOSPHINES
Gerd Wünsch, Speyer (Rhine), Karl Wintersberger, Ludwigshafen (Rhine), and Herbert Geierhaas, Nussloch, uber Heidelberg, Germany, assignors to Badische Anilin- & Soda-Fabrik Aktiengesellschaft, Ludwigshafen (Rhine), Germany
No Drawing. Filed Aug. 4, 1967, Ser. No. 658,345
Claims priority, application Germany, Aug. 10, 1966,
B 88,416
Int. Cl. C07f 9/50, 9/52
U.S. Cl. 260—606.5    6 Claims

---

ABSTRACT OF THE DISCLOSURE

A process for the production of tertiary phosphines by reaction of trialkyl phosphine halides or triaryl phosphine halides with phosphorus at from 100° to 400° C. to form trialkyl phosphines or triaryl phosphines and phosphorus trichloride.

---

It is known that triphenyl phosphine can be obtained by reaction of chlorobenzene and phosphorus trichloride with sodium metal. It is also known that tertiary phosphines can be obtained by reducing triorganyl phosphine dihalides with sodium amalgam or with metallic sodium. The yields of tertiary phosphine vary greatly. In some cases the phosphines can only be detected by their characteristic odor. In the reduction of triorganyl phosphine dihalides with sodium metal, the desired phosphine is obtained in a yield of only about 50 to 70%. A great disadvantage of all these methods is that it is necessary to use finely divided sodium or sodium amalgam and, particularly in commercial operation, special precautions have to be taken.

It has also been proposed to use metal dusts, e.g., aluminum dust, as the reducing agent. This method has the disadvantage, however, that a very specific particle size must be used and the metal halides obtained as byproducts cannot be used.

It is the object of this invention to provide a process which does not have the said disadvantages.

This object is achieved by the process according to the invention which comprises heating a phosphine dihalide having the formula:

(in which $R^1$, $R^2$ and $R^3$ denote alkyl radicals having one to twelve carbon atoms, cycloalkyl radicals having five to twelve carbon atoms, aryl radicals having six to ten carbon atoms or aralkyl radicals having seven to eleven carbon atoms, the said radicals if desired bearing chlorine atoms, bromine atoms or alkoxy or alkyl groups having one to four carbon atoms as substituents, and X denotes a chlorine atom or a bromine atom) with elementary phosphorus to a temperature of from 100° to 400° C. so that tertiary phosphines having the formula:

(in which $R^1$, $R^2$ and $R^3$ have the above meanings) and phosphorus trichloride are formed.

According to a preferred embodiment of the invention, phosphine dihalides having the Formula I are used in which $R^1$, $R^2$ and $R^3$ denote phenyl radicals which may bear chlorine atoms, bromine atoms, alkyl groups having one to four carbon atoms or alkoxy groups having one to four carbon atoms as substituents.

The process according to the invention may be illustrated by the following equation when using triphenyl phosphine dichloride and phosphorus:

$$3(C_6H_5)_3PCl_2 + 2P \rightarrow 3(C_6H_5)_3P + 2PCl_3$$

Phosphorus trichloride is formed at the same time as a valuable byproduct.

The phosphine dihalides used as starting materials are known. They may be prepared for example by reacting suitable phosphine oxides with halogenating agents, such as phosphorus pentachloride or thionyl chloride, or also by reaction of alkyl halides with monohalophosphines or by addition of dienes to dihalophosphines. Examples of suitable starting materials are: the chlorides or bromides of triphenyl phosphine, tripropyl phosphine, tributyl phosphine, tricyclohexyl phosphine, tricyclododecyl phosphine, tritolyl phosphine, trinaphthyl phosphine, phenyl-di-p-chlorophenyl phosphine, tritert.-butyl phosphine, trianisyl phosphine, tolyldibutyl phosphine, or 1-phenyl-1,1-dichloro-1-phosphacyclopentene-(3). The chlorides or bromides of tritolyl phosphine, trinaphthyl phosphine, phenyldi-p-chlorophenyl phosphine and particularly triphenyl phosphine are preferred.

The red and white modifications of phosphorus are both suitable as elementary phosphorus. Because of its good reactivity, white phosphorus is preferred.

The reactants are in general used in about stoichiometric amounts, but an excess, for example an excess of 20%, of one or other of the components has little effect on the reaction.

The reaction is advantageously carried out without any solvent. It is also possible however to use inert solvents or diluents, such as aliphatic hydrocarbons, aromatic hydrocarbons, halohydrocarbons or ethers. The solvents may also be used for example in the form of solvent of crystallization or adducts with the phosphine dihalides.

The reaction may be carried out at temperatures of from 100° to 400° C., particularly from 130° to 250° C. The optimum temperature for a given starting material may readily be ascertained by experiment. The process is usually carried out at atmospheric pressure, the phosphorus trihalide in general being distilled off as the low boiling product. It is also possible however to use superatmospheric pressure, for example up to 50 atmospheres gauge. The reaction mixture is advantageously worked up by distillation.

The tertiary phosphines obtainable according to this invention, particularly the triaryl phosphines, are valuable intermediates for the Wittig reaction for the production of unsaturated compounds.

The following examples will further illustrate the invention; parts are parts by weight.

EXAMPLE 1

99.9 parts of triphenyl phosphine dichloride is heated to 150° C. with 6.2 parts of white phosphorus. Reaction sets in with the formation of phosphorus trichloride which distils off and is condensed in an attached cooling system. Thirty minutes later the temperature is raised to 180° C. and the whole is left at this temperature for one hour. After it has cooled, the residue is digested with twice its volume of ether, small amounts of byproducts are filtered off and the filtrate is freed from ether by distillation. 64 parts (82.1% of the theory) of triphenyl phosphine having a melting point of 77° C. remains behind. 27 parts (98% of the theory) of phosphorus trichloride (purity 99%) is obtained as a byproduct.

EXAMPLE 2

135.75 parts of triphenyl phosphine dichloride containing 1 mole of chloroform as solvent of crystallization and 6.2 parts of white phosphorus are heated to 160° C.

Thirty minutes later, the temperature is raised to 180° C. and the reaction mixture is left at this temperature for an hour. 55.4 parts of a mixture of phosphorus trichloride and chloroform distils off from the reaction mixture. After the residue has cooled it is extracted with three times the amount of ether and the ether is evaporated. 76 parts of triphenyl phosphine (98% of the theory based on triphenyl phosphine dichloride) remains behind.

EXAMPLE 3

150.3 parts of triphenyl phosphine dichloride-tetrachloroethane adduct and 6.2 parts of white phosphorus are first heated to 140° C. One hour later the temperature is raised to 180° C. and held for one hour. 25 parts (91% of the theory based on the adduct) of phosphorus trichloride distils off from the molten reaction mixture; the reaction product is then freed from tetrachloroethane at subatmospheric pressure. The residue is cooled and taken up in three times the amount of ether and the solution is filtered. The ether is evaporated. 75.3 parts (97% of the theory based on triphenyl phosphine dichloride) having a melting point of 76° C. is obtained.

EXAMPLE 4

125.4 parts of the adduct of triphenyl phosphine dichloride and methylene chloride is heated to 150° C. 19.8 parts of methylene chloride distils off. 105.6 parts of pure triphenyl phosphine dichloride remains. 6.05 parts of white phosphorus is added and the mixture is heated to 160° C. Half an hour later the temperature is raised to 180° C. and the reaction mixture is left at this temperature for one hour. During the reaction 22.6 parts of phosphorus trichloride (78% of the theory) distils off. After the reaction mixture has been cooled it is extracted with three times its amount of ether. After the ether has evaporated, 63.2 parts of triphenyl phosphine (corresponding to 82% of the theory based on triphenyl phosphine dichloride) is obtained having a melting point of 75° C.

EXAMPLE 5

120 parts of triphenyl phosphine dichloride is mixed with 7.5 parts of red phosphorus and heated to 190° C. The reaction commences slowly, phosphorus trichloride being distilled off and condensed in an attached cooling system. The temperature of the reaction mixture is slowly raised to 210° C. within three hours. When the reaction is over, distillation is carried out at subatmospheric pressure. Triphenyl phosphine having a melting point of 78° C. is obtained in a yield of 97.2% of the theory based on the dichloride used.

We claim:
1. A process for the production of a tertiary phosphine having the general formula:

which comprises reacting a phosphine dihalide having the general formula:

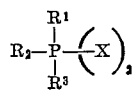

with phosphorus at a temperature of from 100° to 400° C. and separating the tertiary phosphine from the phosphorus trichloride formed as a byproduct, the radicals $R^1$, $R^2$ and $R^3$ in the formula denoting alkyl radicals having one to twelve carbon atoms, cycloalkyl radicals having five to twelve carbon atoms, aryl radicals having six to ten carbon atoms or aralkyl radicals having seven to eleven carbon atoms, the said aryl, aralkyl and cycloalkyl radicals being unsubstituted or bearing as substituents chlorine atoms, bromine atoms, alkyl with one to four carbon atoms or alkoxy with one to four carbon atoms, the alkyl radicals being unsubstituted or bearing the said substituents except alkyl with 1 to 4 carbon atoms and X denoting a chlorine atom or bromine atom.

2. A process as claimed in claim 1 which comprises reacting a phosphine dihalide having the general formula:

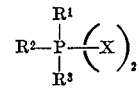

with phosphorus at a temperature of from 100° to 400° C., $R^1$, $R^2$ and $R^3$ denoting unsubstituted phenyl radicals or phenyl radicals bearing chlorine atoms, bromine atoms, alkyl groups having one to four carbon atoms or alkoxy groups having one to four carbon atoms as substituents and X denoting a chlorine atom or a bromine atom.

3. A process as claimed in claim 1 which comprises reacting a phosphine dihalide having the general formula:

in which X denotes a chlorine atom or a bromine atom with phosphorus at a temperature of from 130° to 250° C.

4. A process as claimed in claim 1 which comprises using white phosphorus.

5. A process as claimed in claim 1 which comprises using a solvent.

6. A process as claimed in claim 1 which comprises using a solvent which has combined with the phosphine dihalide to form a crystal adduct.

References Cited

UNITED STATES PATENTS

| | | | |
|---|---|---|---|
| 3,405,180 | 10/1968 | Natoli | 260—606.5 |
| 2,912,465 | 11/1959 | Ramsden | 260—606.5 |
| 2,957,931 | 10/1960 | Hamilton et al. | 260—606.5 X |
| 2,959,621 | 11/1960 | Neibergall | 260—606.5 |
| 3,079,311 | 2/1963 | Hettinger | 260—606.5 X |
| 3,099,684 | 7/1963 | Rauhut et al. | 260—606.5 X |
| 3,099,690 | 7/1963 | Rauhut et al. | 260—606.5 |
| 3,100,799 | 8/1963 | Rauhut et al. | 260—606.5 |
| 3,414,625 | 12/1968 | Natoli et al. | 260—606.5 |
| 3,423,468 | 1/1969 | Zonn et al. | 260—606.5 |

FOREIGN PATENTS

| | | |
|---|---|---|
| 1,504,670 | 8/1967 | France. |
| 1,221,220 | 12/1964 | Germany. |

TOBIAS E. LEVOW, Primary Examiner

W. F. W. BELLAMY, Assistant Examiner

U.S. Cl. X.R.

23—205